Patented Dec. 8, 1942

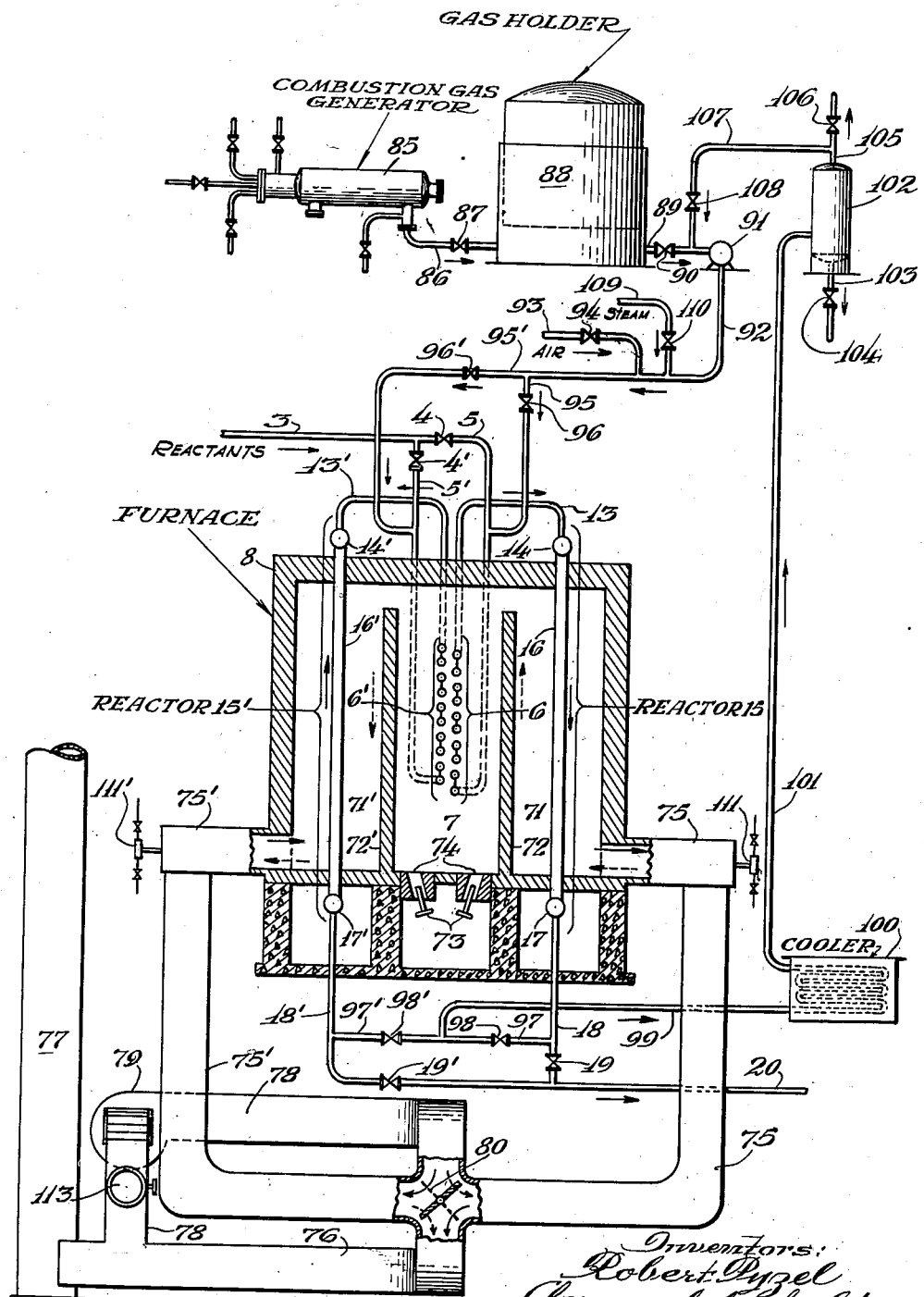

2,304,203

UNITED STATES PATENT OFFICE 2,304,203

CONDUCTING CATALYTIC CONVERSION REACTIONS

Robert Pyzel, New York, N. Y., and Clarence G. Gerhold, Chicago, Ill., assignors to Universal Oil Products Company, Chicago, Ill., a corporation of Delaware Application October 2, 1941, Serial No. 413,248

6 Claims. (Cl. 196—52)

This is a continuation-in-part of our co-pending application Serial No. 245,840, filed December 15, 1938.

This invention relates to a method for conducting and controlling simultaneous and separate endothermic and exothermic reactions. More specifically, it is concerned with temperature control in processes such as catalytic cracking, for example, in which catalytic masses in one zone are being revivified with an exothermic reaction while similar masses in another zone are being contacted with hydrocarbons with an endothermic conversion reaction.

Many endothermic catalytic conversion reactions such as catalytic cracking deposit upon the catalyst carbonaceous substances which must be removed periodically by combustion in order to maintain the catalyst at a practical level of activity. It is desirable, therefore, to apply at least a portion of the exothermic heat of combustion liberated during the revivification reaction in the endothermic conversion reaction. The purpose of this invention is to accomplish this result in a practical and economical manner.

An important feature provided in the preferred embodiment of the invention resides in the use of externally heated reactors, wherein the catalytic material is disposed, each of which comprises a plurality of elongated tubular elements joined at their opposite ends by headers or the like, which permit the parallel flow of vapors therethrough in contact with the catalyst. This parallel, multiple tube arrangement greatly decreases pressure drop through the conversion zone as compared with series flow through the same tubes or a single tube of the same diameter and same total length as the several tubes. As compared with the use of a reactor comprising a drum or chamber of relatively large diameter, it greatly decreases the tendency for channeling and short circuiting through the catalyst bed and greatly simplifies the problem of obtaining a substantially uniform temperature throughout the cross-sectional area of the catalyst bed in a plane transverse to the general direction of flow of the vapors, due to the greater tube surface per volume of catalyst. The use of a reactor comprising small diameter tubes also largely eliminates pockets and inactive areas in the catalyst bed which are common to drum or chamber type reactors. With the small diameter tubes, practically every catalyst particle in the bed comes in contact with the stream of vapors or gases undergoing treatment. As a consequence, the catalyst is more efficiently utilized and the volume of vapors treated in a given time per unit volume of catalyst may be considerably increased.

Another important feature of the invention resides in the use of two or more reactors which are each alternately employed for conducting the catalytic reaction and for reviving the previously used catalyst. At frequent predetermined intervals during the operation, the stream of vapors to be converted is switched from the reactor through which they have been flowing and wherein the catalyst has become partially fouled by the deposition of carbonaceous material to another reactor containing freshly revivified catalyst. The catalyst in the first mentioned reactor is then revivified by passing a stream of oxygen-containing gases therethrough and burning away the deposited carbonaceous material.

The invention further provides a system of temperature control for the materials undergoing catalytic cracking and the catalyst undergoing revivification, which comprises generating hot combustion gases, first utilizing the same to heat the reactants and/or the oxygen-containing gases to the desired temperature prior to their contact with the catalyst, utilizing the resulting partially cooled combustion gases to supply heat to the endothermic reaction by passing the same about the reactor in which the endothermic conversion is taking place, subsequently using combustion gases which have given up a substantial portion of their heat to the endothermic reaction as a cooling medium in the exothermic revivification step, by passing the same about the reactor containing the catalyst undergoing revivification, and returning resulting reheated combustion gases as a recycled heating medium to the zone containing the reactor in which the endothermic conversion is taking place.

Preferably, the conversion cycle in each reactor is of substantially the same duration as the revivification cycle in the other reactor and when the flow of reactants and reactivating gases is switched with respect to the reactors, the direction of flow of the combustion gases in the above described cycle is reversed so that the heating and cooling conditions prevailing about the respective reactors is reversed and thus the process is continued without interruption and without any changes in the firing conditions, stack draft or other operating conditions of the furnace which would upset smooth and uninterrupted operation of the process.

The features of the invention and their cooperative relation and advantages are more concretely illustrated in the accompanying diagrammatic drawing. The drawing shows, partially in section and partially in elevation, one specific form of apparatus embodying the features above outlined and in which the process of the invention may be successfully conducted.

Referring now to the drawing, the reactants which are to be subjected to the endothermic conversion reaction such as cracking, for example, are supplied to the process through line 3, whereafter they are treated in a manner to be described more fully later. It will be noted that the furnace structure 8 which contains heating coil 6 and reactor 15 also contains a duplicate heating coil 6' and reactor 15', each reactor comprising a plurality of reaction tubes interconnected at each end by a suitable header. Heating coils 6 and 6' are disposed within a central combustion and radiant heating zone 7, while reactors 15 and 15' are located, respectively, in zones 71 and 71' disposed on opposite sides of zone 7 and separated therefrom by the respective bridge walls 72 and 72'. Valve 4', line 5', line 13', and valve 19' connect heating coil 6' and reactor 15' in series between lines 3 and 20. Coil 6 and reactor 15 are connected in the same manner by valve 4, line 5, line 13, line 18, and valve 19.

As previously indicated, the reactors 15 and 15' are alternately employed as zones in which an endothermic conversion reaction is effected and zones in which the partially spent or fouled catalyst is revived. Therefore, when reactor 15 is employed for the endothermic conversion, the reactants are supplied through valve 4, line 5, heating coil 6, and thence through line 13 and header 14 into a plurality of reaction tubes 16, wherein the endothermic conversion reaction is effected. Only one of the reactor tubes 16 is shown in the particular view of the apparatus here illustrated. The reaction products from tubes 16 are withdrawn through header 17, line 18, valve 19, and are thereafter directed through line 20 to any suitable concentrating or separating equipment of any conventional form. This auxiliary equipment is not a novel part of the present invention and is therefore not illustrated.

While reactor 15 is being used for this purpose, combustion gases generated in zone 7 from fuel and air supplied thereto by means of burners 73 and firing ports 74 are supplied over bridge wall 72 to zone 71, after they have given up a substantial portion of their heat to the materials passing through coils 6 and 6'. Additional heat is abstracted from the combustion gases as they pass through zone 71 and is supplied to the materials undergoing conversion in reactor 15. The thus cooled combustion gases pass through duct 75 to flue 76 wherefrom, during normal operation, a quantity of the combustion gases corresponding to the quantity of gases supplied from zone 7 to zone 71 are discharged from the system through stack 77, while the remainder are directed by means of fan or blower 79 and ducts 78 and 75' to the zone 71' containing reactor 15'. They serve in zone 71' as a cooling medium to control the temperature of the catalyst undergoing regeneration in reactor 15'. The combustion gases thus reheated in zone 71' are returned over bridge wall 72' and 72 to zone 71, together with additional combustion gases from zone 7.

Before the catalyst in reactor 15 becomes fouled or spent to such a degree that its decreased activity substantially reduces the yield and quality of the desired products, the stream of reactant vapors from line 3 is diverted through valve 4' and line 5' to coil 6' and thence through line 13' to reactor 15', valve 4 in line 5 and valve 19 in line 18 being closed, and the catalyst in reactor 15 is revived, as will be later described. At substantially the same time that this switch is made, the direction of flow of the combustion gases through zones 71 and 71' and ducts 75 and 75' is reversed by reversing the position of damper 80 to that indicated by the dotted line designated by this number, so that the conditions which prevailed in zone 71 are duplicated in zone 71' and vice versa without changing the firing conditions in zone 7 or otherwise upsetting the smooth and continuous operation of the process.

Provision is also made for controlling the temperature of the combustion gases being supplied to the exothermic zone in indirect heat exchange therewith. It will be noted that burners 111 and 111' are provided in ducts 75 and 75' respectively for either continuous or intermittent operation so that the cooling gases being directed through the blower 79 and damper 80 may be heated if necessary. To accomplish cooling of these gases, on the other hand, a valved duct 113 is provided on the suction side of blower 79 so that regulated quantities of cold air may be admixed with the hot combustion gases supplied through duct 78. By these means, proper control of the temperature of the gases entering section 6 or 6' of the furnace may be effected. The invention is not to be limited to these means of heating or cooling the heat exchange gases, however, since other well known methods may also be employed.

Revivification of the catalyst is accomplished by controlled oxidation of the carbonaceous materials deposited thereon and, to control the rate of oxidation and prevent the development of excessive temperatures in the catalyst bed during revivification, regulated amounts of oxygen or oxygen-containing gas, such as air, are preferably commingled with a stream of relatively inert fluid such as steam or oxygen-free combustion gases and passed through the reactor containing catalyst to be revivified. One specific means of accomplishing this is illustrated in the drawing and will be now described, although it should be understood that the invention is not limited to this specific method and means of regeneration.

Combustion gases are generated under pressure in a suitable combustion zone 85 and after being cooled by scrubbing or other suitable means are directed through line 86 and valve 87 to gas-holder 88 which acts as a storage reservoir. The combustion gases are withdrawn from the reservoir through line 89 and valve 90 to pump or compressor 91 wherefrom they are discharged through line 92. Regulated quantities of air are admixed with the combustion gases passing through line 92 by means of line 93 and valve 94, from a suitable compressor or the like, not shown.

In some instances, the presence of steam has been found to have a beneficial effect during revivification of the catalyst and the invention contemplates the use of steam and air alone for revivification or the use of steam in admixture with air and relatively inert gases such as combustion gases, for example. Steam may be supplied to the reactor in which revivification is taking place by means of line 109 and valve 110 communicating with line 92.

When the catalyst in reactor 15 is being revivified, the mixture of gases and air passes from line 92 through line 95 and valve 96 to and through heating coil 6, wherein it is heated to the required temperature and thence passes through line 13 to reactor 15. The resulting products are discharged from the reactor through line 18 and are directed through line 97 and valve 98 to line 99 and thence through cooler 100 and line 101 to drum 102, wherein water resulting from the inclusion of steam in the products of combustion is separated and wherefrom it is removed through line 103 and valve 104. The remaining products may be discharged from the system through line 105 and valve 106, but preferably during the major portion of the operation these gases are returned through line 107 and valve 108 to pump or compressor 91 for recirculation and, after this cycle of operation is established, valve 90 in line 89 may be closed. Preferably, however, toward the end of each revivification cycle, gases are discharged from drum 102 through valve 106, valve 108 in line 107 being closed, and valve 90 in line 89 being opened to admit combustion gases from gas-holder 88 to pump 91. The purpose of this is to prevent the accumulation of excessive quantities of oxygen in the gases employed for revivification after burning has been substantially completed in some, but not all, of the tubular elements of the reactor.

When revivification of a catalyst in reactor 15 is completed, the flow of hydrocarbon vapors may be diverted from reactor 15' back to reactor 15 by closing valves 4' and 19' and opening valves 4 and 19. At substantially the same time this switch is made, valve 96 in line 95 and valve 98 in line 97 are closed and valves 96' and 98' in their respective lines 95' and 97' are opened to permit the flow of revivifying gas through reactor 15' and revivify the catalyst in this zone while cracking is taking place in reactor 15.

Preferably, operation of the various valves which must be opened and closed to switch the flow of revivifying gases and hydrocarbon vapors with respect to the reactors and the positioning of damper 80, which determines the direction of flow of the combustion gases in zones 71 and 71' and ducts 75 and 75', is accomplished by means of a master controller set to operate at predetermined time intervals.

The entire switch-over may be accomplished automatically and a definite time schedule for processing and revivification in each reactor maintained. The present invention is not concerned with the specific mechanism for accomplishing this and, to avoid unnecessary complication of the drawing, it is not illustrated. It is worthy of note, however, that to accomplish the switch-over some of the valves are opened at the same or approximately the same time that others are being closed and, in the preferred embodiment of the invention, this is accomplished through a single controller by means of a combination of direct and reverse-acting pressure actuated valves. However, valves operated by solenoids or electric motors may be substituted, when desired. It is also worthy of note that all of the valves are preferably not opened or closed at exactly the same time. Preferably, the rate at which revivification of the catalyst is accomplished is controlled so that revivification is completed a short time before the switch-over is made and during this interval the reactor in which revivification is taking place, is purged of oxygen-containing gases by discontinuing the supply of oxygen to line 92 through line 93 and valve 94 and passing only oxygen-free combustion gases from gas-holder 88 through the reactor. When this purging is completed, hydrocarbon vapors are admitted to the purged reactor and, for a time sufficient to allow the hydrocarbon vapors to displace the oxygen-free combustion gases therefrom, the valve admitting materials from this reactor to line 20 remains closed and the combustion gases pass through line 99 to cooler 100, after which the aforementioned valve admitting vapors to line 20 is opened and the valve through which combustion gases have been passing to line 99 and cooler 100 is closed. When the hydrocarbon vapors are admitted to the reactor in which the catalyst has been revivified, oxygen-free combustion gases are passed through the other reactor to purge the same of hydrocarbon vapors which pass through line 20 to chamber 21 and, after a sufficient lapse of time to accomplish this purging, the valve admitting products from this reactor to line 20 is closed, the valve admitting them to line 99 and cooler 100 is opened and air is admitted to line 92. To accomplish this it is only necessary to adjust the controller for a short time lag between the switching of the valves at the upper end of the reactors and the switching of the valves at the lower end of the reactors, valve 94 in line 93 being opened simultaneously with the switching of the valve at the bottom of the reactors.

Since the zone containing the reactor in which catalyst revivification is taking place operates at a lower furnace temperature than that containing the reactor in which catalytic cracking is taking place, it is desirable to allow a short period for the readjustment of these temperatures before the streams of hydrocarbon vapors and revivifying gases are switched. This is accomplished by changing the position of damper 80 a short time prior to switching of the streams of hydrocarbon vapors and revivifying gases.

It is, of course, entirely within the scope of the invention to manually operate the various switching valves and damper 80, but to eliminate the chance of error and to greatly simplify operation of the process, automatic equipment, such as above mentioned, is preferably employed, particularly since the switch-overs are ordinarily quite frequent, two hour periods usually being about the maximum time permissible with cracking catalysts of the type preferably employed if substantially uniform operation with respect to yield and quality of the desired products is to be maintained.

Although the above discussion has been directed chiefly to a catalytic cracking process, various other hydrocarbon conversion processes may employ the features of this invention advantageously. For example, such processes as dehydrogenation of liquids or gases, reforming, aromatization, isomerization and the like may successfully be operated according to this invention.

We claim as our invention:

1. In a process wherein exothermic and endothermic reactions are conducted simultaneously in separate conversion zones, the improved method of operating which comprises establishing a flow of a convective medium in indirect heat exchange relationship first with the exothermic zone and then with the endothermic zone to remove heat from said exothermic zone and to supply heat to said endothermic zone, heating the reactants supplied to each of said zones by indirect contact with a fresh stream of hot gases, thereafter commingling the last named stream with said convective medium at a point along the line of flow of the latter subsequent to said exothermic zone but prior to said endothermic zone, removing the convective medium from contact with said endothermic zone, and thereafter returning a portion thereof to contact with said exothermic zone as the aforementioned convective medium.

2. In a process wherein a contact material is alternately employed in an endothermic reaction and an exothermic reaction and wherein two separate masses of said contact material are employed, one of said masses being utilized for the endothermic reaction and the other for the exothermic reaction at any given time, the improved method of operating which comprises heating the reactants being continuously supplied to each of the contact masses in a stream of hot gases, contacting a gaseous medium to effect heat exchange, first with the mass being utilized in said exothermic reaction to absorb a portion of the heat therefrom and second, after being commingled with the aforesaid hot gases, with the mass being employed in said endothermic reaction to supply a portion of the heat thereto, and thereafter returning a portion of the commingled gases for further contact in the first heat exchange step as the aforesaid gaseous medium.

3. In a process wherein a hydrocarbon is contacted with a catalytic mass resulting in an endothermic conversion reaction and wherein carbonaceous substances deposited on said mass by said endothermic conversion reaction are removed by contacting with oxygen-containing regenerating gas resulting in an exothermic reaction, two zones containing said catalytic mass being employed to provide for continuous operation, one which at any time is processing hydrocarbons while the other is undergoing regeneration, the improved method of operating which comprises heating the hydrocarbon reactants and the fresh regenerating gas by indirect heat exchange with hot combustion gases, removing heat from the zone in which the exothermic reaction is being effected by means of a gaseous medium in indirect heat exchange relationship therewith, thereafter commingling the resulting hot gaseous medium with the hot combustion products employed for heating the charge to both of said zones as hereinbefore set forth, contacting the resulting mixture in indirect heat transfer relationship with the zone in which the endothermic reaction is being effected to supply a portion of the heat thereto, and returning a portion of the resulting cooled gases for further contact with the zone in which the exothermic reaction is being effected, after first readjusting its temperature.

4. In a process wherein a hydrocarbon is contacted with a catalytic mass resulting in an endothermic cracking reaction and wherein carbonaceous substances deposited on said mass by said endothermic cracking reaction are removed by contacting with oxygen-containing regenerating gas resulting in an exothermic reaction, two zones containing said catalytic mass being employed to provide for continuous operation, one of which at any one time is cracking hydrocarbons while the other is undergoing regeneration, the improved method of operating which comprises heating the hydrocarbon reactants and the fresh regenerating gas by heat exchange with hot combustion gases, contacting a gaseous medium in indirect heat exchange relationship with the zone in which the exothermic reaction is being effected to absorb a portion of the heat therefrom, commingling the resulting hot gaseous medium with the hot combustion products employed for heating the charge to both of said zones as hereinbefore set forth, contacting the resulting mixture in indirect heat transfer relationship with the zone in which the endothermic cracking reaction is being effected to supply a portion of the heat thereto, and returning a portion of the resulting cooled gases for further contact with the zone in which the exothermic reaction is being effected, after first readjusting its temperature.

5. In a process wherein a hydrocarbon is contacted with a catalytic mass resulting in an endothermic dehydrogenation reaction and wherein the carbonaceous substances deposited on said mass by said endothermic dehydrogenation reaction are removed by contacting with oxygen-containing regenerating gas resulting in an exothermic reaction, two zones containing said catalytic mass being employed, one of which at any one time is dehydrogenating hydrocarbons while the other is undergoing regeneration, the improved method of operating which comprises heating the hydrocarbon reactants and the fresh regenerating gas by heat exchange with hot combustion gases, contacting a gaseous medium in indirect heat exchange relationship with the zone in which the exothermic reaction is being effected to absorb a portion of the heat therefrom, commingling the resulting hot gaseous medium with the hot combustion products employed for heating the charge to both of said zones as hereinbefore set forth, contacting the resulting mixture in indirect heat transfer relationship with the zone in which the endothermic dehydrogenating reaction is being effected to supply a portion of the heat thereto, and returning a portion of the resulting cooled gases for further contact with the zone in which the exothermic reaction is being effected, after first readjusting its temperature.

6. In a process comprising endothermic and exothermic reactions simultaneously conducted in separate reaction zones, the improved method of operation which comprises establishing a cyclic flow of convective fluid in series about the zones of endothermic and exothermic reactions and in heat exchange relation with the reactants undergoing treatment therein to supply heat to the endothermic reaction and abstract heat from the exothermic reaction, supplying reactants to each of said zones, heating said reactants prior to their introduction into the respective reaction zones by passing the same in heat transfer relation with hot convective fluid derived from without the aforementioned cycle thereof, thereafter introducing the last named convective fluid into said cycle subsequent to passage thereof about the zone of exothermic reaction and prior to passage thereof about the zone of endothermic reaction, removing convective fluid from said cycle subsequent to its passage about the zone of endothermic reaction and prior to its passage about the zone of exothermic reaction and in quantities regulated to compensate for the convective fluid added to the cycle as above described, and adjusting the temperature of the remaining convective fluid of the cycle prior to its passage about the zone of exothermic reaction.

ROBERT PYZEL.
CLARENCE G. GERHOLD.